United States Patent
Keil et al.

(10) Patent No.: US 8,316,380 B2
(45) Date of Patent: Nov. 20, 2012

(54) PROCESS LOG SUPPORTING MULTIPLE FLAVORS OF PROCESSES

(75) Inventors: Ulrich A. Keil, Heidelberg (DE); Bhushan Nigale, Bangalore (IN); Peter Amrhein, Wiesloch (DE); Peter Gernold, Schriesheim (DE)

(73) Assignee: SAP AG, Walldorf (DE)

( * ) Notice: Subject to any disclaimer, the term of this patent is extended or adjusted under 35 U.S.C. 154(b) by 1082 days.

(21) Appl. No.: 11/859,714

(22) Filed: Sep. 21, 2007

(65) Prior Publication Data

US 2009/0083759 A1 Mar. 26, 2009

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................ 719/318; 719/313
(58) Field of Classification Search .................. 719/313, 719/318
See application file for complete search history.

(56) References Cited

U.S. PATENT DOCUMENTS

| | | | | |
|---|---|---|---|---|
| 6,584,491 | B1 * | 6/2003 | Niemi et al. | 709/202 |
| 6,742,143 | B2 * | 5/2004 | Kaler et al. | 714/39 |
| 6,754,704 | B1 * | 6/2004 | Prorock | 709/224 |
| 2002/0138571 | A1 * | 9/2002 | Trinon et al. | 709/204 |
| 2004/0187048 | A1 * | 9/2004 | Angamuthu et al. | 714/27 |
| 2005/0172162 | A1 * | 8/2005 | Takahashi et al. | 714/4 |
| 2008/0077656 | A1 * | 3/2008 | Broda | 709/203 |

* cited by examiner

*Primary Examiner* — Diem Cao
(74) *Attorney, Agent, or Firm* — Mintz, Levin, Cohn, Ferris, Glovsky and Popeo, P.C.SA

(57) ABSTRACT

A system and method for monitoring activity of heterogeneous components of a business application are disclosed. A system includes a local event infrastructure within each of the heterogeneous components. The local event infrastructure includes an event manager to detect one or more events of the business application, and an event filter to filter the one or more events detected by the event manager. The system further includes a messaging platform to transmit messages indicative of filtered events from the local event infrastructure to a user interface of a central monitoring system, and a process log displayed in the user interface to generate and display a log of the one or more events.

17 Claims, 2 Drawing Sheets

PROCESS LOG SUPPORTING MULTIPLE FLAVORS OF PROCESSES

BACKGROUND

This disclosure relates generally to computer-based mechanisms for monitoring activity of a business application, and more particularly to an infrastructure for monitoring local events of a distributed business application.

Business applications, such as Customer Relationship Management (CRM) applications, Enterprise Resource Planning (ERP) applications, or Product Lifecycle Management (PRM) applications, usually lack communications necessary to be able to accurately monitor business activity within the application. Further, many business applications are executed across a distributed computing landscape having a number of heterogeneous data sources. Resolution of anomaly events within the business activity is very difficult or impossible because of such different data sources and different interpretations of events that occur with such data.

SUMMARY

In general, this document discusses a system and method for providing a new process log implementation that fulfills accessibility requirements and provides facilities to adapt the process log according to the special usages/flavors of the process engine (guided procedures, ccBPM, Workflow, etc.).

In one aspect, a system for monitoring activity of heterogeneous components of a business application includes a local event infrastructure within each of the heterogeneous components. The local event infrastructure includes an event manager to detect one or more events of the business application, and an event filter to filter the one or more events detected by the event manager. The system further includes a messaging platform to transmit messages indicative of filtered events from the local event infrastructure to a user interface of a central monitoring system, and a process log displayed in the user interface to generate and display a log of the one or more events.

In another aspect, a system for monitoring activity of heterogeneous components of a business computing system includes a business application configured to execute a set of business processes across the heterogeneous components, a process engine to run a process instance for each business process, and an event manager to detect one or more events of the business processes. The system further includes an event filter to filter the one or more events detected by the event manager, and a monitoring system having a process log to generate a log of the one or more events according to unique characteristics, qualities or attributes of the process engine.

In yet another aspect, a system for resolving events of a business application includes a process engine to run instances of business processes of the business application, and a local event infrastructure associated with the business process engine. The local event infrastructure includes an event manager to detect one or more events of the business processes based on a number of predetermined conditions, and an event filter to filter the one or more events detected by the event manager according to a relevance to an operation of the business application. The system further includes a process log displayed in a user interface of a monitoring system, the process log generating a log of the one or more events.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
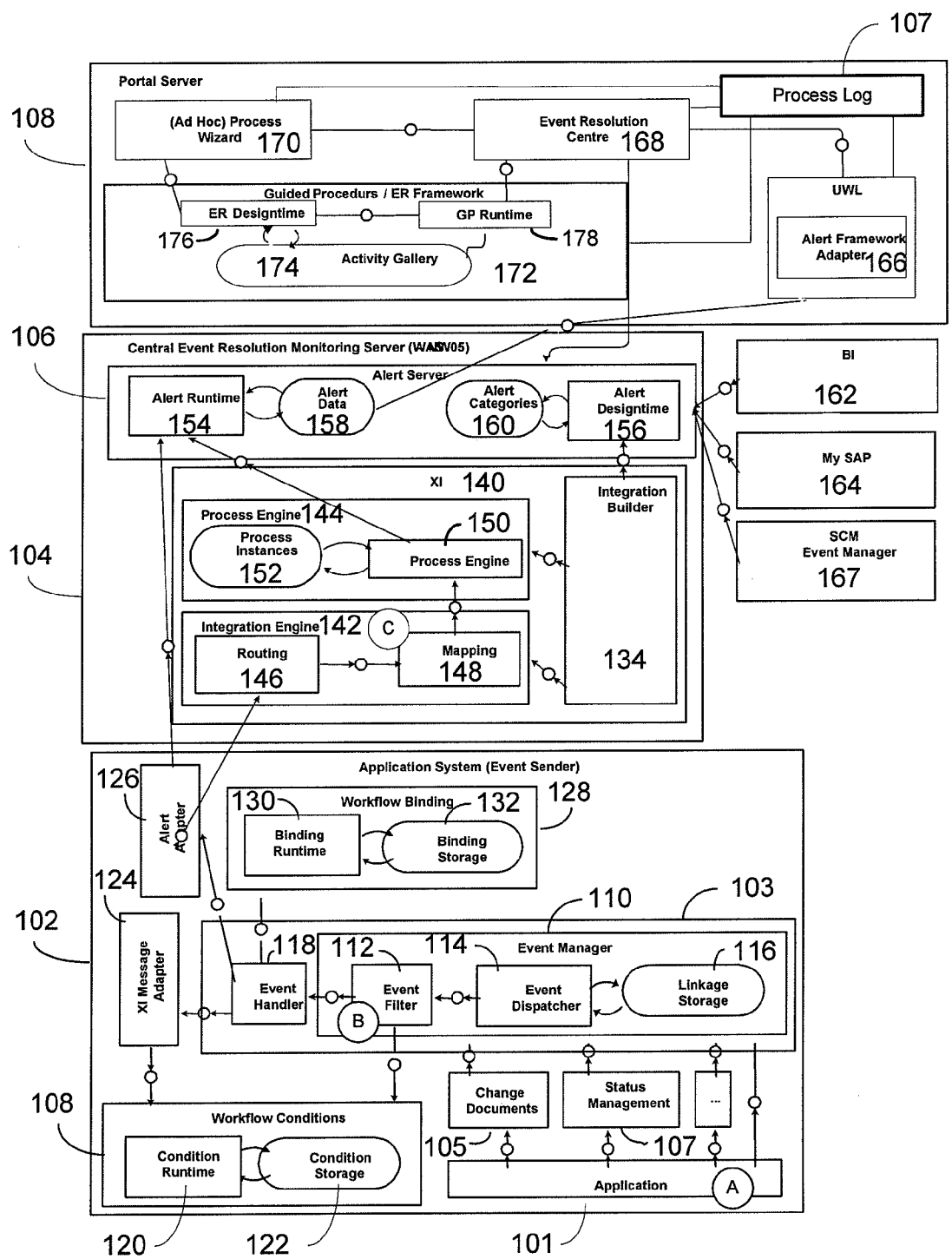
FIG. 1 is a block diagram of a system for monitoring heterogeneous components of a distributed business application.

One comprehensive solution to the problem of monitoring activity of a business application is the Business Activity Monitoring (BAM) platform provided by SAP AG of Walldorf, Germany. A monitoring system such as BAM monitors workflow events of business impact within an executing business application, and deduces actions if necessary. BAM can span both the applications of an application system landscape as well as the application orchestration layer, i.e. the integration processes. A business application is often executed across a distributed computing landscape, and has a number of heterogeneous data sources.

Accordingly, this document describes a system and method of a process log implementation that fulfills accessibility requirements and provides facilities to adapt the process log according to the special usages or "flavors" (i.e. one or more of a set of identifiable or distinctive characteristics, qualities or attributes) of the process engine (Guided Procedures, ccBPM, Workflow . . . ) of a BAM platform.

The Monitoring Process Infrastructure is built on the XI messaging layer as well as the cross-component Business Process Engine. That means: all performance and throughput considerations made there apply also for Event Resolution.

A monitoring process collects events raised by heterogeneous systems, and deduces action items to be completed by business experts. Monitoring processes are predefined using an Integration Builder (IB) tool or the like, and work items are created as a consequence of process execution. BAM also introduces the concept of a monitoring even. A monitoring event is a notification in the form of an exchange infrastructure (XI) message sent to the monitoring process about a significant state change in the business application system.

An application can discharge monitoring events using message communication, and therefore a monitoring event also represents a message interface that refers to message type, etc. Each already existing message communication can be used to supply monitoring processes with information. Additional monitoring events are necessary when no message communication exists already.

A monitoring process collects events raised by diverse sources such as an application system or component of a business suite, and deduces action items to be completed by business experts. The monitoring processes are predefined using an Integration Builder (IB) tool or the like, and work items are created as a consequence of process execution. Monitoring processes can also represent the so-called "end-to-end" business processes to show milestones.

A monitoring event is a notification sent to the monitoring process about a significant state change in the application system or component. In preferred implementations, the transport medium of monitoring events are messages, and the transport mechanism is a messaging infrastructure. Thus, monitoring events are transported as messages, and heterogeneous systems in the application system landscape can participate in monitoring processes.

An application can discharge monitoring events using message communication, and therefore a monitoring event also represents a message interface that refers to message type, etc. Each already existing message communication can be used to supply monitoring processes with information. Additional monitoring events are necessary when no message communication already exists. Workflow events can be used to enable application systems to fire monitoring events to eventually produce an event resolution Workflow events are created all over the system directly, or indirectly via 'generic event enablers' such as business transaction events, a message control (NAST) system, a Post Processing Framework (PPF), Change Documents, a Logistics Information System, change of personnel data, etc.

Monitoring events are messages mapped into messages that can be routed to a ccBPM process instance using correlations. This mapping also offers the full range of data sources for event resolution, while enabling recognition of information already provided by existing interfaces (RFCs, iDocs, Proxies, . . . ). Thus, even 'normal' messages for integration purposes can be used to provide information to a monitoring process without changing the backend system. Monitoring events as 'normal' messages carry identifiers that enable correlation into a running process instance. Alert categories produce workflow events that can be used to fire monitoring events. Since monitoring events are configured as 'normal' messages, any type of system that is able to send messages can participate in a monitoring process.

Monitoring events are preferably transported using an integration server architecture called Exchange Infrastructure (XI) and assume an XI message communication protocol (using proxies, RFCs or idocs). An application can fire monitoring events using message communication. Thus, a monitoring event is a message interface (referring to message type, and so on) in integration repository terms. Each existing message communication can be used to supply monitoring processes with information. Additional monitoring events may be necessary when no message communication exists already.

Workflow events are used to enable application systems to fire monitoring events. These workflow events are mapped structurally from business object to message proxy and filtered, at least in part to avoid an overload of the central integration server. Workflow events are a common mechanism to signal an object state change to an instance that decides whether a monitoring event needs to be created.

Monitoring events are converted from workflow events, and result in a proxy call in the local application system. The event data is sent by the proxy to the monitoring process instance. Monitoring events as message interfaces and the configuration of the routing are maintained centrally on the integration builder repository and directory. The connection between workflow events and monitoring events is created locally on the respective application system. Alert management can also be considered as a generic event enabler for workflow events. Data from the alert data context can be mapped to workflow events to be used for firing monitoring events.

FIG. 1 illustrates a business application system 100 that aggregates and evaluates monitoring events detected from one or more heterogeneous business applications 101. The business application system 100 monitors the relevant business issues across the business application system 100, normalizes the issues into a standard message protocol, alerts responsible users, and supports the resolution of the business issues. A business issue can be an error in the runtime of a business application 101, an integration problem among two or more business applications 101 or systems, or other problem that affects the proper functioning of the business applications 101. The business application system 100 includes an application system 102, a central event resolution monitoring server 104 including an alert server 106, and a portal server.

Detecting business issues is performed by a local event infrastructure 103 as a part of the application system 102. The local event infrastructure 103 includes an event manager 110 to manage detection of events and mapping the events to exchange infrastructure (XI) messages. The event manager 110 includes an event dispatcher 114 that interprets linkage tables in a linkage storage 116 between events of an application 101 and an event consumer, such as a BAM system. The events are detected by the event manager from a change documents module 105, an application status management module 107, or other module that can generate a message representing a state change of an instance of an application 101 process.

The event manager 110 further includes an event filter 112 that filters events based on conditions, thresholds, parameters, etc., and checks the relevance of the events, based on workflow conditions 108. The event filter 112 then executes an event handler 118 for relevant events. The workflow conditions 108 includes a condition storage 122 that stores one or more conditions of a workflow of the application 101, and which are executed and evaluated by a condition runtime engine 120. As will be discussed below, the conditions can be established via modeling tool such as an integration builder 134.

The event handler 118 translates relevant events into a monitoring event based at least in part on a workflow binding module 128. The workflow binding module 128 includes a binding storage 132 and a binding runtime engine 130 that executes a binding function. The event handler 118 also prepares an alert for the monitoring event via an alert adapter 126.

As discussed above, the integration builder 134 is used to define the monitoring events, monitoring processes, process-relevant alert categories, mappings, etc., and to configure each monitoring process. To streamline the setup of the local event infrastructure 103, settings will be made centrally to the greatest extent possible. The integration builder 134 is part of the XI 140. The XI 140 also includes a integration engine 142 and a process engine 144. The integration engine 142 includes a routing module 146 to route XI message-configured monitoring events to the desired message recipient, i.e. the alert server 106. The integration engine 142 also includes a mapping module 148 to map monitoring events to monitoring processes. The monitoring processes are executed by a process engine 150 that is controlled by the integration builder 134, and which generates and runs process instances 152.

The alert server 106 is configured to manage and link alert categories to users. The alert server 106 includes an alert design time module 156 that generates and stores the alert categories 160. The alert server 106 further includes an alert runtime 154 that generates and stores alert data 158 based on messages received either from the process engine 150 or from the alert adapter 126 in the application system 102. Alerts needing or requiring resolution are sent in the form of alert data to an alert framework adapter for resolution in the portal server 108.

Several components can have access to or supply information to the alert server 106. The alert server 106 may be connected with a business intelligence (BI) system 162. BI is adapted to configure key performance indicators for the business application system 100. A role-based set of application tools, such as a MySAP suite of application tools 164, can be used by the alert server 106. Finally, an application-specific event manager 167 can be used to manage events as indicated by the alert server 106.

The portal server 108 provides a portal that includes an event resolution center 168, a graphical user interface in which a user can resolve issues for which alerts have been generated and for which monitoring events and monitoring processes have been created. The event resolution center 168 can be connected to a process wizard 170, which can logically, and in an ad-hoc manner, walk a user through steps to resolve or fix the issue, and can track user actions in such resolutions.

The process wizard 170 and event resolution center 168 use a guided procedures/event resolution framework 172. This framework 172 includes an activity gallery 174 of possible activities that can be undertaken by a user of the portal server. The activities in the activity gallery 174 are used by an event resolution design time module 176, which creates templates of possible resolutions to issues. The activities are also used by a guided procedure runtime module 178 which executes guided procedures for the event resolution center 168. The event resolution design time module 176 can also save new activities to the activity gallery 174 based on feedback from the process wizard 170 for dynamic, self-learning and future use.

The event resolution center 168, guided procedures/event resolution framework 172, and alert framework 166 provide inputs to a process log 107 that supports many different "flavors," i.e. one or more of a set of identifiable or distinctive characteristics, qualities or attributes, of processes that are tracked by the process log 107. The process log 107 is configured according to monitoring processes established for monitoring events of the business processes of a distributed business application, especially where the business application is formed of heterogeneous computing systems or software.

Not all business object state changes are relevant for event resolution in the BAM system, and whether or not a monitoring event needs a decision is made. This decision is evaluated locally (in the application system, before the monitoring events is transmitted via external communication) to minimize external communication and to provide all application data as decision base for the condition that decides whether the event is event resolution relevant or not.

The event filter performs filtering using a "start condition" that runs on business objects to reduce the delivered events. Alternatively, check-functions allow stopping an event upon an application decision. Each application can create a check-function for each case or use the more generic start conditions. Start conditions are preferably only used for workflow start, but could be adapted to check all kinds of events. These conditions are maintained locally in the application system. Event coupling and condition definition should be done locally in the application system to access the object attributes and available events. In addition, some applications need customizing steps to enable firing events.

There are a number of places within the business application system 100 where it can be decided whether a status change (event in application system) or a message communication is relevant for a monitoring process. As shown in circled reference characters, the locations or points in time can be the following: very early filtering on the application system (A); early filtering on the application system in the workflow event (B); late filtering on the integration server (C).

Different filter locations mean different costs for the overall filtering process. The earlier a monitoring event can be intercepted (that means declared as not relevant) the lower the costs are. The earlier filtering takes place, the more data is available. That means, e.g. filtering on the integration server costs most, because the monitoring event is already on the wire and only the message payload is subject to filter conditions. Also, the later filtering takes place the more can be deployed from a central maintenance tool.

Very early filtering on the application system 101 can be done by the application using application specific customizing, or alternatively reusing the workflow condition editor. Early filtering on the application system 101 is possible using the 'Start Condition' discussed above.

The workflow event mechanism already provides a mechanism to reduce the delivered events. The check-functions allow stopping an event upon application decision. Each application can create an own check-function for each case or use the more generic mechanism of so-called start conditions. Start conditions can be used for workflow start, but could be adapted to check all kinds of events. These conditions must be maintained locally in the application system as long the integration repository has no access to the business object metamodel of each application system. The business objects do not exist in the integration builder.

The event coupling and the start conditions are maintained locally in the application system, because only there are all needed repositories (e.g. BOR, Class Library, . . . ) available. That means the event coupling and the condition definition are done locally in the application system to access the object attributes and available events. In addition, some applications need customizing steps to enable firing events.

All data on which a condition is running must be gathered before the condition is executed. Thus, if a condition execution needs more data than available in the process container, the person modeling the process must call several services (using the XI messaging layer via Send and Receive steps) to get the data in the process container. The process can react upon errors during this data enrichment phase and eventually react upon these errors and propagate alert. This makes sure that the condition technology will not implement yet another workflow tool to handle exceptions during a data enrichment phase.

Figure 2:
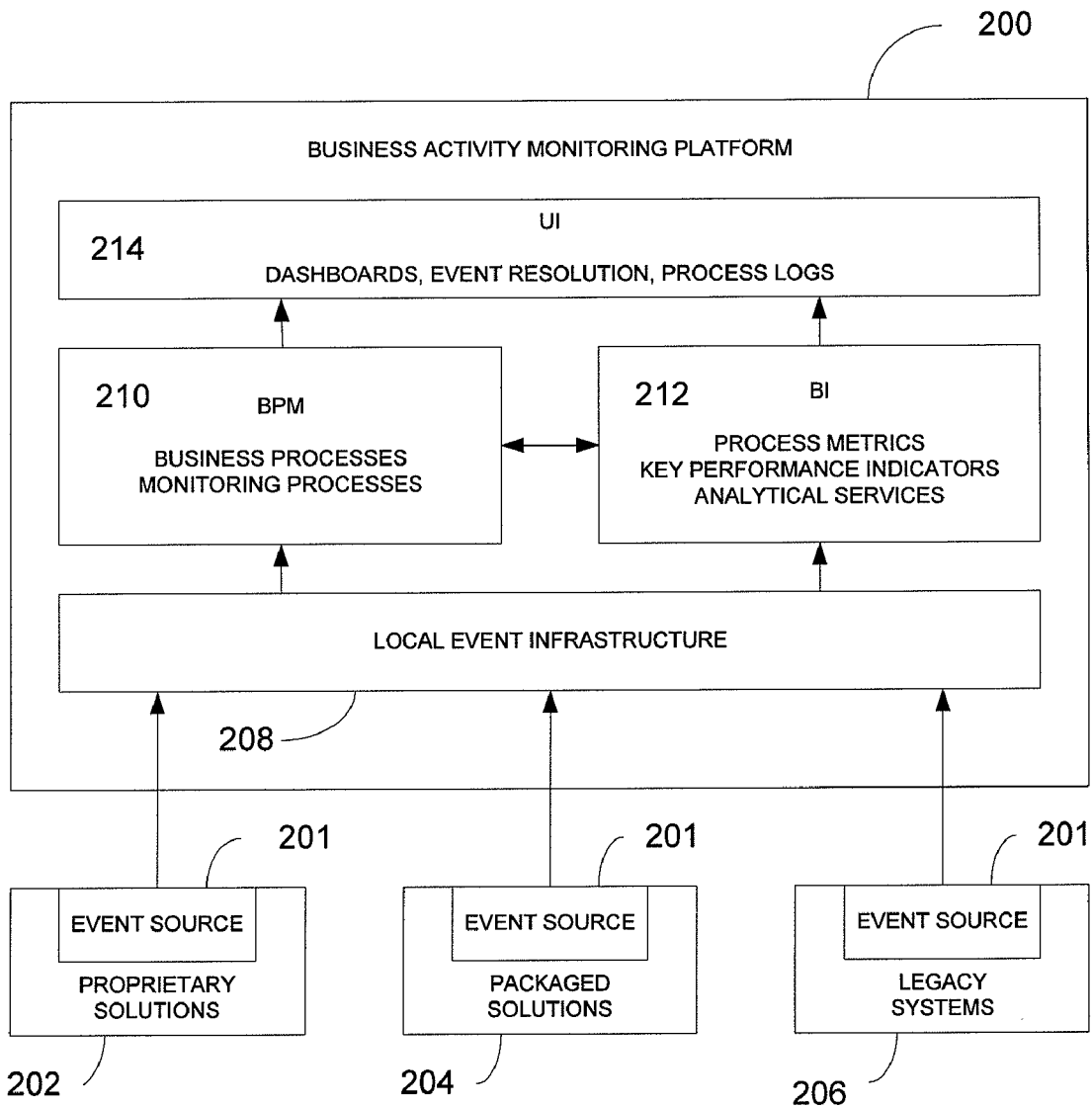
FIG. 2 is a block diagram of a business activity monitoring platform including a process log implementation.

In some implementations, events generated by heterogeneous sources are normalized to XI messages that can be selectively linked to other XI messages. Such events include workflow events created all over the system landscape. As shown in FIG. 2, one or more event sources 201 are generated by heterogeneous sources such as proprietary solutions 202, packaged solutions 204, and legacy systems 206. The events are detected from the event sources 201 and collected and monitored in a local event infrastructure 208, where they are mapped against monitoring events and monitoring processes defined for the heterogeneous sources.

The local event infrastructure 208 filters relevant events for transmission, via XI message protocols, to a business process monitoring tool 210, which monitors business processes and executes monitoring processes on those business processes. The local event infrastructure 208 and business process monitoring tool 210 also communicate with a business intelligence tool 212, which tracks and evaluates business metrics, key performance indicators, and analytical services on the monitoring events.

The business process monitoring tool 210 and the business intelligence tool 212 are accessed and controlled via a user interface 214, preferably in a graphical interface such as a portal. The user interface 214 includes graphical control elements such as one or more dashboards, an event resolution center, and process logs that supports different flavors of processes. Accordingly, events that are triggered by business processes from any of a set of heterogeneous business application components can be displayed in the process log in the user interface 214, for efficient tracking and tracing of information associated with the business processes.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A system for monitoring activity of heterogeneous components of a distributed business application, the system comprising:

a local event infrastructure within each of the heterogeneous components, the local event infrastructure comprising an event manager, implemented by one or more processors, to detect one or more events of the distributed business application based on a plurality of predetermined conditions defined in a central monitoring system and according to a workflow of the distributed business application based on a set of business objects that comprise the distributed business application, and an event filter, implemented by one or more processors, to filter the one or more events detected by the event manager according to a relevance of one or more of the plurality of predetermined conditions to an operation of the distributed business application, the filtering being performed based on a location of a corresponding heterogeneous component of the plurality of heterogeneous components, such that early filtering is performed in the distributed business application, the early filtering being performed in the event manager, and later filtering being performed on an integration engine of the plurality of distributed heterogeneous components that maps the one or more events to business processes that are distributed across heterogeneous components of the business application;

a messaging platform, implemented by one or more processors, to transmit messages indicative of filtered events from the local event infrastructure to a user interface of the central monitoring system; and a process log displayed in the user interface to generate and display a log of the one or more events.

2. A system in accordance with claim 1, wherein the distributed business application includes a plurality of business processes that are distributed across the heterogeneous components.

3. A system in accordance with claim 1, wherein the central monitoring system further includes an event resolution center based on the information provided by the process log.

4. A system in accordance with claim 1, wherein the process log is adapted to display information representing the one or more events according to unique characteristics, qualities or attributes of a process engine of the monitoring system.

5. A system in accordance with claim 4, wherein the process engine is configured to run a plurality of process instances according to the business processes of the distributed business application.

6. A method in accordance with claim 1, wherein the filtering is based on the one or more conditions of the plurality of predetermined conditions, the one or more conditions being evaluated automatically by a condition runtime engine of the heterogeneous components.

7. A system for monitoring activity of heterogeneous components of a business computing system, the system comprising:

a business application executed by one or more processors and configured to execute a set of business processes across the heterogeneous components according to a set of business objects that comprise the business application, the business application being a single distributed business application implemented over a distributed computing landscape;

a process engine, implemented by one or more processors, to run a process instance for each business process;

an event manager, implemented by one or more processors, to detect one or more events of the business processes based on a plurality of predetermined conditions defined in a central monitoring system and according to a workflow of the business application based on the set of business objects;

an event filter, implemented by one or more processors, to filter the one or more events detected by the event manager according to a relevance of one or more of the plurality of predetermined conditions to an operation of the business application, the filtering being performed based on a location of a corresponding heterogeneous component of the plurality of heterogeneous components, such that early filtering is performed in the distributed business application, the early filtering being performed in the event manager, and later filtering being performed on an integration engine of the plurality of distributed heterogeneous components that maps the one or more events to business processes that are distributed across heterogeneous components of the business application; and a monitoring system, implemented by one or more processors, having a process log to generate a log of the one or more events according to unique characteristics, qualities or attributes of the process engine.

8. A system in accordance with claim 7, wherein the monitoring system further includes a user interface.

9. A system in accordance with claim 8, wherein the process log is further configured to display the log of the one or more events in the user interface.

10. A system in accordance with claim 9, wherein the process log is further configured to display the log of the one or more events based on the unique characteristics, qualities or attributes of the process engine.

11. A system in accordance with claim 7, further comprising a messaging platform, implemented by one or more processors, to transmit messages indicative of the one or more events between the event filter and the monitoring system.

12. A system in accordance with claim 11, wherein the messaging platform further includes an alert server to generate alerts for the monitoring system based on the filtered one or more events, wherein the alert server is configured to link categories of the generated alerts to corresponding users, each category of the generated alert comprising one or more alerts.

13. A system for resolving events of a business application, the system comprising:

a process engine, implemented by one or more processors, to run instances of business processes of the business application;

a local event infrastructure associated with the business process engine and comprising an event manager, implemented by one or more processors, to detect one or more events of the business processes based on a plurality of predetermined conditions defined in a central monitoring system and according to a workflow of the business application based on a set of business objects that comprise the business application, and an event filter, implemented by one or more processors, to filter the one or more events detected by the event manager according to a relevance of one or more of the plurality of predetermined conditions to an operation of the business application, the filtering being performed at a time based on a location of the filtering, the business application being a distributed business application comprising a plurality of distributed heterogeneous components and the filtering being performed based on a location of a corresponding heterogeneous component of the plurality of heterogeneous components, such that early filtering is performed in the distributed business application, the early filtering being performed in the event manager, and later filtering being performed on an integration engine of the plurality of distributed heterogeneous components that maps the one or more events to business processes that are distributed across heterogeneous components of the business application; and a process log displayed in a user interface of a monitoring system, the process log generating a log of the one or more events.

14. A system in accordance with claim 13, further comprising a business process monitoring tool, implemented by one or more processors, for monitoring business processes of the business application according to the filtered one or more events.

15. A system in accordance with claim 14, wherein the business process monitoring tool includes a monitoring system comprising an event resolution framework providing one or more resolution tools to resolve each of the filtered one or more events of the log.

16. A system in accordance with claim 15, further comprising a user interface displaying an event resolution interface for operating the one or more resolution tools.

17. A system in accordance with claim 16, wherein the process log is further configured to display the log in the user interface according to unique characteristics, qualities or attributes of the process engine.

* * * * *